Feb. 5, 1963  R. A. MARVIN ETAL  3,076,271
FLIGHT TRAINING AND EVALUATING EQUIPMENT
Filed Jan. 9, 1961  7 Sheets-Sheet 7

Fig. 7.

United States Patent Office 3,076,271
Patented Feb. 5, 1963

3,076,271
FLIGHT TRAINING AND EVALUATING
EQUIPMENT
Ronald Arthur Marvin, Horsham, Meville Leslie Shelley, Hurstpierpoint, and Archer Michael Spooner, Boulters Lock, Maidenhead, England, assignors to Communications Patents Limited
Filed Jan. 9, 1961, Ser. No. 81,467
Claims priority, application Great Britain Jan. 22, 1960
11 Claims. (Cl. 35—12)

This invention relates to flight training and evaluating apparatus, in which objects external to an aircraft, as seen by the crew of an aircraft during a real flight are visually represented.

Modern flight training makes use of flight simulators in which the responses of an aircraft's instruments to the settings of the pilot's or an instructor's controls and many other effects are simulated as faithfully as possible throughout the whole of a simulated flight exercise. The more comprehensive equipments used provide a visual presentation of objects seen from the flight deck of an aircraft, particularly during take-off, landing and other low altitude phases of a flight.

Similar flight simulating equipment is also used for investigations concerning the design of equipment for aeronautical purposes, for example in the evaluation of runway lighting schemes, visual aids to landing and so on.

In the following descriptions and in the appended claims, references solely to flight training apparatus are intended to include such evaluating apparatus.

In such systems of visual presentation, objects external to an aircraft may be represented by use of an intermediate projected image of a selected area of a plan-view transparency of the ground. This intermediate image may be projected on to a flat screen, the final image which is presented to the trainee crew being provided by a television receiver fed with signals from a television camera viewing the screen. The television camera is then positioned with respect to the screen, and arranged to move relatively to the screen, in such a way that the final image of the external objects, as viewed by the trainee crew, is modified correspondingly to the simulated movements of the aircraft.

In a more advanced system of a visual presentation, using such a closed-circuit television system, the external objects are represented by a scale model in natural color, the image presented to the trainee crew being provided by a color television receiver fed with signals from a television camera arranged to view the model. The camera is movable relatively to the model, so that the view presented of the external objects changes correspondingly to to the simulated movements of the aircraft.

In such arrangements, it is unsatisfactory for a camera, using a normal viewing angle optical system, to look from above at the intermediate image on the screen or to look from above at the model, with the axis of the optical system perpendicular to the ground plane, because it is necessary for the horizon also to be represented. Optical systems possessing a sufficiently wide angle of view to represent the horizon when used in this manner, are not available.

The camera lens must therefore look along the plane of the screen or along the ground plane of the model. Hitherto, much difficulty has been experienced in obtaining a clear image of all represented objects at different distances from the camera, especially as the screen or model is often of considerable extent.

It is an object of the present invention to provide an improved visual presentation system for flight training or evaluating purposes, giving a well-focused view of represented objects situated over a large area of the intermediate image or of the model.

Another object of the invention is to provide the feature stated above with a lens system of large effective aperture, so as to avoid the need for excessively bright illumination of the intermediate image or model in order to obtain adequate television camera signals.

A further object of the invention is to provide such a visual presentation in which realistic perspective is maintained in the view presented, so as to enhance the realism of the presentation.

According to one aspect of the invention, flight training apparatus includes a representation of an object, a television camera tube having a camera screen, a lens system associated with the camera tube for viewing at least a portion of the said representation and for forming an image of the viewed portion of the representation on the said camera screen, the plane of one or more of the component lenses of the lens system being adjustably inclinable to another or to others of the component lenses and to the camera screen, means to adjust the inclination of the adjustable lens or lenses and simultaneously to move the camera tube in such a manner that all points on the image formed by the lens system on the camera screen are in focus for all positions of the adjustable lens or lenses, and means for providing relative movement of the television camera tube and the said representation in accordance with a simulated movement of an aircraft relative to the object.

According to a further aspect of the invention, the flight training apparatus also includes means for modifying the line and frame scanning of the television camera tube, to compensate for the scale distortion over the field of the camera tube image introduced by inclination of the lens system.

Before describing embodiments of the invention, brief mention will be made of the properties of an optical system in which the plane of the lens system is inclined to the object plane. By the "plane of a lens system" is meant that plane to which the axis of the lens system is normal and which is positioned such that the ratio of the axial distances, object to lens plane/image to lens plane, is the same as, object to the first principal plane/image to the second principal plane.

With a positive lens, the object and the inverted image are on opposite sides of the plane of the lens system. When the object plane is inclined to the optical axis, and hence to the plane of the lens, it will be found that the image plane is also inclined to the plane of the lens. The image plane, lens plane and object plane all intersect on a common line. The separation and inclination of the image plane from the lens plane can be determined by applying the familiar lens formula to the parts of an object on the inclined object plane. The scale of the image will be distorted over its area, those parts of the image more remote from the lens centre being relatively exaggerated in size.

It is a further property of an optical system that if the lens system is inclined to the object plane, all points on this object plane, regardless of their distances from the lens centre, are in focus on the correspondingly inclined image plane provided, of course, that the lens system is correctly focused for any one point. Such a lens system can be used to focus correctly, at large aperture, all parts of a model or of a pictorial scene or of a projected image extending over a considerable area. Such a lens system is therefore well-suited for use in association with the television camera of visual training apparatus of the type previously described.

Figure 1:
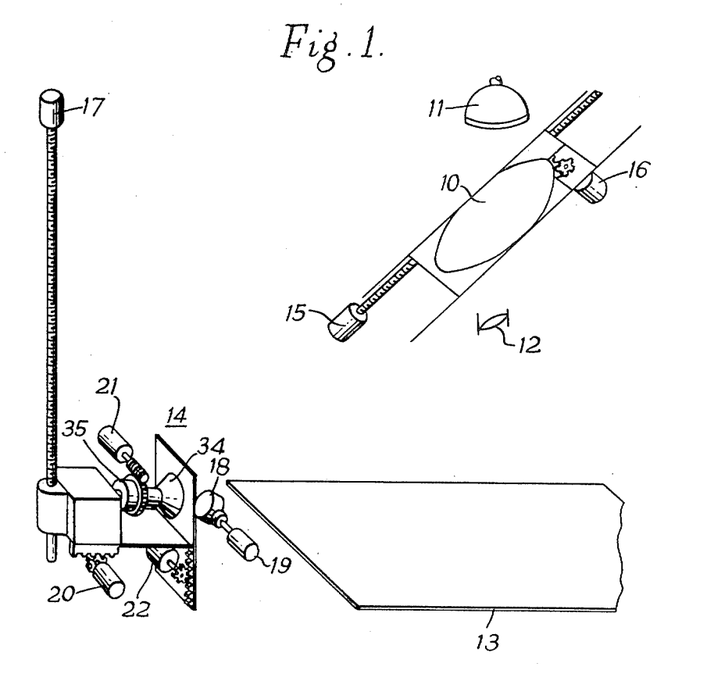
FIG. 1 is a diagrammatic perspective view of flight simulating apparatus adapted for exercises in cross-country flying.

In order that the invention may be readily carried into effect, two embodiments will now be described in detail, by way of example, with reference to accompanying drawings in which:

FIG. 1 shows, in simplified form, part of a flight training equipment using an inclined lens in the optical system of a television camera movably mounted for viewing a representation of the ground over which simulated flights are to take place.

A plan-view transparency 10 of the ground is illuminated by light source 11 and an image of a small area of the transparency 10 is projected by means of a lens 12 onto a flat screen 13. A television camera 14, comprising a camera tube 34, is mounted to view the image formed on the screen 13. This image is made to move correspondingly to the simulated forward movement of the aircraft, and the simulated heading of the aircraft, by means, respectively, of servo mechanisms 15 and 16, attached to the carriage supporting the transparency. These servo mechanisms 15 and 16 are controlled by ground-speed and azimuth computing elements of an associated trainer or flight-simulator. The servo mechanism 16 rotates the transparency to change the simulated heading and the servo mechanism 15 moves the transparency laterally at a speed corresponding to the simulated speed of the aircraft.

The vertical distance of the television camera 14 above the screen 13 is made adjustable to correspond to changes in the simulated altitude of the aircraft represented. A servo mechanism 17, controlled from the height computing element of the associated flight simulator, raises or lowers the television camera 14 for the purpose.

The camera 14 has a lens system 18 which is inclinable, so that the plane of the lens system 18, the plane of the screen of the camera tube 34 and the plane of the screen 13 all intersect on a common line, in accordance with the principle already discussed. The inclination of the lens system 18 is variable and the camera tube 34 movable back and forth axially to permit the condition of intersection of the planes to be maintained for all conditions of simulated aircraft altitude. The lens system 18 and the camera tube 34 are moved simultaneously by means of servo mechanism 19 and 20 respectively, both servo mechanisms being connected to an element of the height determining system in the associated flight simulator.

The image formed on the screen of the camera tube 34 is distorted in scale, due to the inclination of the camera lens 18. The transparency 10 and the projection lens 12 are inclined, relatively to the screen 13, so as to diminish in size the image formed on the screen 13 at the end thereof nearer to the camera by an amount which compensates for the scale distortion introduced by the camera lens 18.

The planes of the transparency 10, the lens 12 and the screen 13 are arranged to intersect on a second common line. The inclination of the lens 12 and the inclination of the transparency 10 are varied by servo mechanisms (not shown) connected to the height determining system of the associated flight simulator, so that the requirements for correct focus of the image projected on the screen 13 are always maintained and the appropriate degree of scale-correction is introduced at all simulated aircraft altitudes.

It is necessary to provide additional movements of the camera 14 corresponding to the simulated attitude of the aircraft and this is accomplished by suitable movements of the camera and parts of its optical system. In this example, roll is simulated by rotation of the camera tube 34 and its deflection system 35, about the axis of the tube 34, by a servo mechanism 21, in accordance with the position represented by the roll servo of the associated flight simulator. Pitch is represented by a transverse movement of the camera tube 34, the extent of the movement being determined by a servo mechanism 22 connected to the pitch system of the flight simulator.

In another embodiment of the invention, the image as presented for observation by a trainee crew, is corrected in perspective. This embodiment is therefore very suitable for simulation exercises in take-off and landing and will now be described with reference to FIG. 2.

Figure 2:
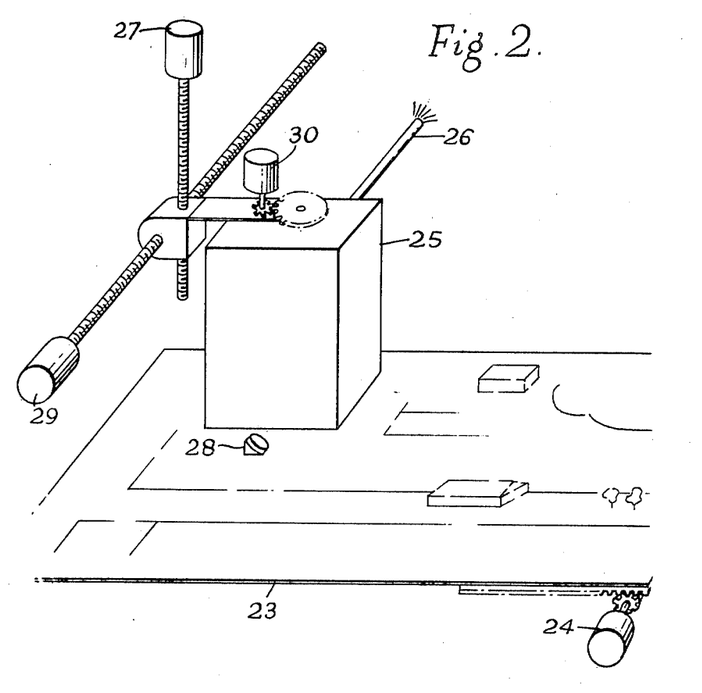
FIG. 2 is a diagrammatic perspective view of modified flight simulating apparatus providing realistic perspective in the presented view.

In FIG. 2, a scale model 23, having details in natural colors to represent an aerodrome, landing field or the like, is moved as a whole, back and forth, by means of a servo mechanism 24. Servo mechanism 24 is connected to the ground-speed computing system of an associated flight simulator.

The model 23 is viewed by a television camera 25 provided with an inclined lens system. Servo mechanisms, not shown in FIG. 2, are provided for controlling the movement of the camera lens and camera tube in the manner corresponding to that already described with reference to the embodiment of FIG. 1. These servo mechanisms are connected to the altitude system of the associated flight simulator by conductors of a multicore cable 26.

Other servo mechanisms are provided, as in the embodiment of FIG. 1, for moving the television camera and the parts of its optical system, to allow effects corresponding to simulated altitude and attitude of the aircraft to be introduced in the visual display, in accordance with the behaviour of the associated flight simulator. Altitude is determined by a lead screw servo mechanism 27 and attitude by servo mechanisms within the camera (not shown) which are connected to the pitch and roll systems via the cable 26.

A mirror prism 28, set at an angle of 45° with respect to the ground plane of the model 23, permits the camera 25 itself to be mounted above and kept clear of the model 23, so that exercises can be carried out in which the simulated aircraft position is near to or on the ground.

As the scene viewed by the television camera 25 is represented by a uniform scale model, the image formed on the camera tube by the lens system of the camera is progressively distorted in scale from near to distant parts of the scene. To overcome this effect, the line and frame scanning circuits associated with the camera tube comprise means for modifying the scanning waveforms so as to change progressively the length of the scanning lines and the distance between consecutive lines by an amount which compensates for the said scale distortion and permits a picture substantially free from distortion to be formed at the receiver. The extent of the electronic corrections applied varies with the simulated altitude of the aircraft. A servo mechanism, not shown in FIG. 2, is operated from the height system of the associated flight simulator, by way of the cable 26, to adjust electrical control elements in the scanning circuits to the required extent.

The simulated forward movement of the aircraft is represented in two directions by the back and forth movements of the model 23. When the simulated aircraft is following a flight path other than in the direction of the length of the model 23, that is to say obliquely to the movement provided by servo mechanism 24, a transverse movement is imparted to the camera 25 and leadscrew servo mechanism 29. The transverse velocity of the camera 25 and the velocity of the model 23 are computed from signals derived from the ground-speed computing system in the associated flight simulator. The camera 25 is orientated as a whole correspondingly to the simulated heading of the aircraft by a servo mechanism 30.

The method employed for representing simulated attitude of the aircraft are not restricted to those previously described with reference to the embodiment of FIG. 1. For example, pitch may be introduced by varying the angle of the mirror 28 instead of by moving the camera tube of camera 25.

If it is desired to represent a considerable area of countryside, without using a model of excessive size, it is necessary for the object lens of the television camera to be of short focal length, so that the working distance between the lens and the model is small during the "on ground" part of an exercise.

When such a lens is used, the image formed by the lens occupies a relatively small area of the camera tube screen. It is therefore necessary to introduce magnification into the optical system of the camera, if definition is to be retained. A lens arrangement adapted for this purpose includes, in addition to an inclinable objective, a field lens and a composite projection lens, the field lens, the projection lens and the camera tube being mounted on a common axis. An image of the scene viewed is formed by the objective substantially at the plane of the field lens. This image is magnified by the projection system and is reformed on the screen of the camera tube. The field lens permits the projection lenses to be kept to a convenient size.

It is usually possible to accept some compromise in focus, and a simplification of the lens adjusting mechanism can be made by setting the object lens to a fixed inclination, at the best intermediate position between the ideal "on ground" and the ideal "maximum altitude" conditions. Focusing is carried out by moving the projection lens back and forth along the same axis as that of the field lens and the camera tube. The required movement is made by means of a servo mechanism coupled to the height system of the associated flight simulator.

A suitable lens system, for use with the television camera 25 of the embodiment of FIG. 2, will now be described more fully with reference to FIG. 3. The lens system of FIG. 3 comprises three lens units. With this arrangement it is possible to bring the lens system close to the surface of the model 23, so as to obtain a realistic representation of the scene in the "on ground" condition and at the same time produce an image utilising the full working area of the image surface of the camera tube.

Figure 3:
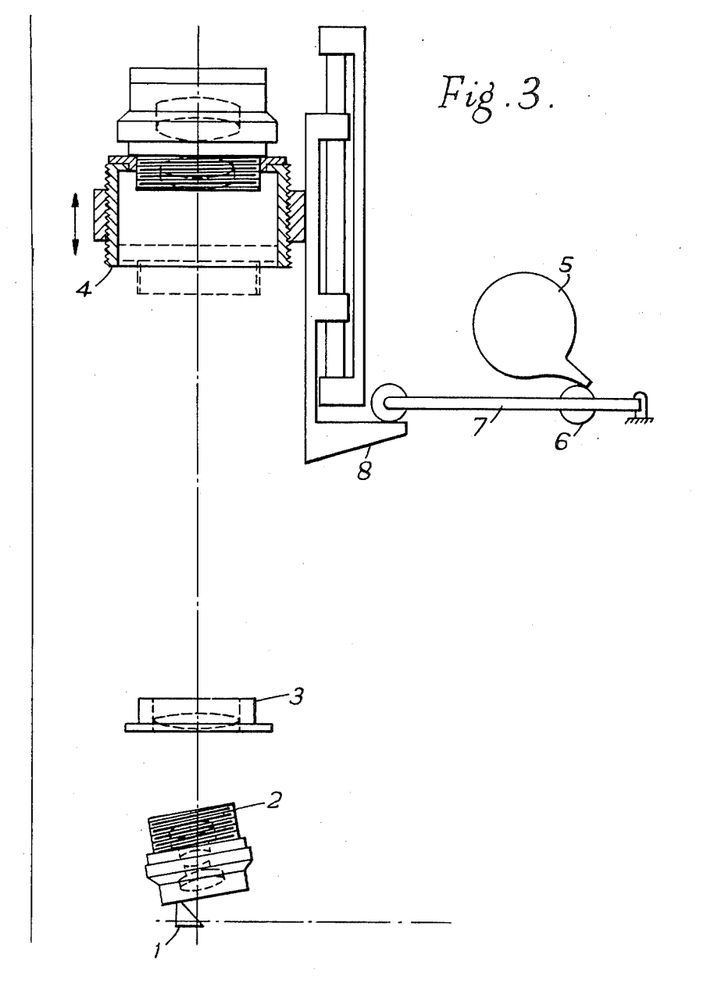
FIG. 3 is a part sectional side elevation view of a lens system for use in the apparatus of FIG. 2.

Referring to FIG. 3, a first lens unit 2 forms an image of the scene viewed by a mirror prism 1 at or near to the plane of a second lens unit 3. Some deterioration in sharpness of image is permissible. The inclination of the lens unit 2 is therefore set to an intermediate position, between the ideal "on ground" and "maximum altitude" positions, to give the best overall focus at all simulated aircraft heights.

The lens unit 3 is a field lens which enables the size of a third lens unit 4 to be kept small, without reducing the aperture of the lens system. The image formed at lens unit 3 is viewed by the lens unit 4. Lens unit 4 forms a magnified image of the image formed at lens unit 3, of the correct size for the screen of the camera tube.

The system is focused by to and fro movement of the lens unit 4. To provide this movement, a cam 5 is rotated by a servo mechanism coupled to the height system of the associated flight simulator. The cam 5 is rotated to a position to correspond to the simulated height of the aircraft. The resulting movement of a cam follower 6 and a lever arm 7 cause a carriage 8 carrying the lens unit 4 to move in the desired manner.

In some cases, it is more convenient to correct the scale distortion introduced by an inclined camera lens system, by means of oblique projection instead of by electronic methods for controlling the camera tube scanning waveforms. One embodiment provides correction of scale distortion by using a television receiver of the projection type and arranging for the projected image to be thrown obliquely onto a viewing screen.

In this embodiment, the viewing screen is mounted in front of a dummy aircraft fuselage, which is occupied by a trainee crew during a flight exercise. The projector of the television receiver is then mounted above the axis of the dummy fuselage, with its optical axis inclined downwards to cut the viewing screen surface at an oblique angle.

The inclination of the viewing screen to the axis of projection is varied by a servo mechanism, in accordance with the simulated height of the aircraft, so that scale distortion is corrected at all altitudes. If a certain amount of scale distortion can be tolerated, the axis of projection is fixed at an oblique angle to give the best compromise at all altitude.

A preferred lens system and optical element control system, suited for use in the apparatus of FIG. 2, will now be described with reference to FIG. 4.

Figure 4:
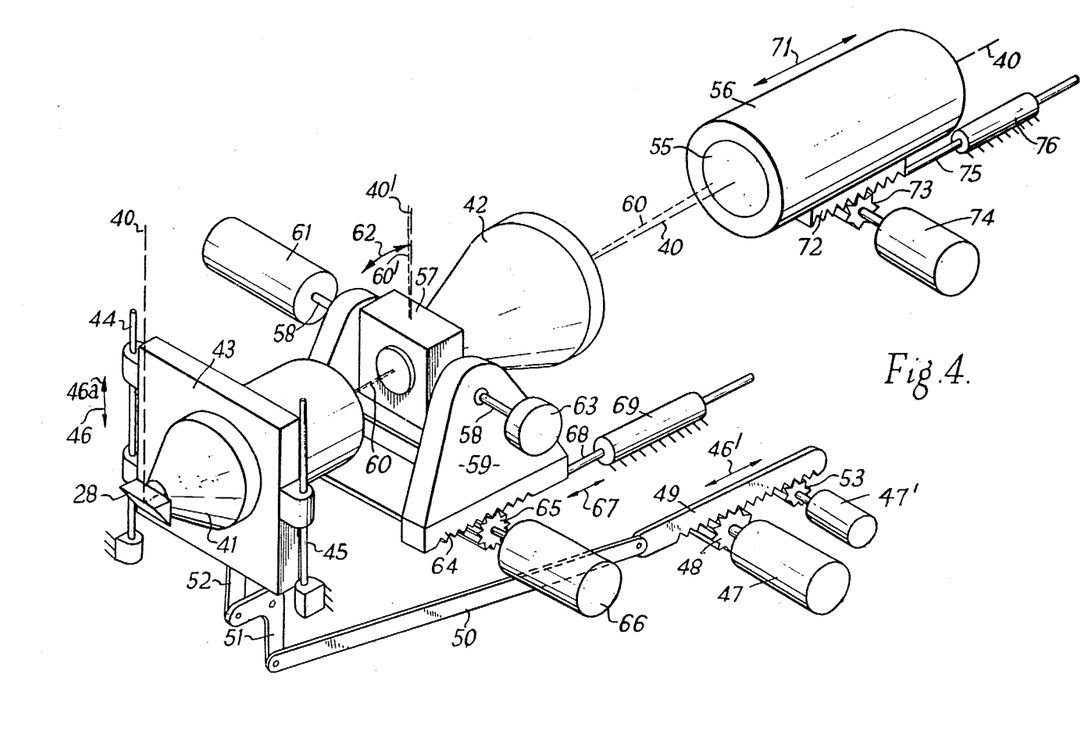
FIG. 4 is a perspective view of a preferred lens system for use in the apparatus of FIG. 2.

The apparatus of FIG. 4 comprises two multiple-element lenses 41 and 42 having the following optical characteristics:

Lens 41:
    Focal length____________________inches__ 0.176
    $f$. number______________________________ 1.76
    Angular field___________________________ 53°
    Entrance pupil_____________inch diameter__ 0.1

Lens 42:
    Focal length____________________inches__ 0.709
    $f$. number______________________________ 1.5
    Angular field___________________________ 80°

The lens 41 views the model, in a direction generally in the direction of the length of the model, by way of the reflecting prism 28, and provides a spatial image of a portion of the model. The lens 41 is carried in a mount 43 which is slidable laterally on guides 44 and 45 to move in the directions of the arrows 46 according to simulated pitch movement of the aircraft.

The lateral movement of the mount 43 is provided by a combined servo motor, speed-reduction gear box and tacho-generator unit 47 having a pinion 48 driving a rack 49 in directions of the arrows 46'. The lateral movement of rack 49 is transmitted by way of link 50, bell crank 51 and arm 52 to the mount 43.

Driven by the rack 49 is a pinion 53 which in turn drives a control synchro unit 47' to provide negligible output signal when the pitch setting corresponds to that of the pitch angle of the associated flight simulator.

The lens 42 views the spatial image provided by the lens 41 and in turn provides an image in the plane of the photocathode 55 of an image orthicon television camera tube 56.

The axis of the camera tube 56 and the coincident axis of the lens 41 is shown by the dash-line 40. A perpendicular to axis 40 in the plane of lens 42 is shown by the dash-line 40'.

The lens 42 is carried in a mount 57 which is supported on trunnion bearings 58 carried in a frame 59. The trunnion axis lies in the plane of lens 42 and intersects the axis 40. The mount 57, together with lens 42, can be tilted about the trunnion axis by a combined servo-motor, speed-reduction gear box and tacho-generator unit 61, which rotates the trunnion bearing 58 on one side of the mount 57. The trunnion bearing 58 on the other side of the mount 57 drives a tilt position transducer 63.

The axis of the lens 42, tilted at a small angle to the axis 40, is shown by the dotted line 60 in FIG. 4. The perpendicular to the axis 60 and the trunnion axis is shown by the dotted line 60'. The tilt movement of lens 42 is thus indicated by the arcuate arrows 62, in the plane of lines 40' and 60'.

The frame 59 is mounted on guides, not shown, for displacement in the directions parallel to the axis 40, as shown by the arrows 67. For this purpose, the frame 59 carries a rack 64 which is engaged by a pinion 65 driven by a combined servo-motor, speed-reduction gear box and tacho-generator unit 66. This movement provides for focusing by lens 42 of the spatial image of lens 41, according to the height of lens 41 above the model 23 of FIG. 2. An arm 68, connected to the frame 59, drives a position transducer 69 to provide an output signal corresponding to the focusing position of lens 42.

The camera tube 56 is also mounted on guides, not shown, for displacement in the directions parallel to the axis 40, as shown by the arrows 71. For this purpose, the camera tube assembly carries a rack 72 which is engaged by a pinion 73 driven by a combined servo-motor, speed reduction gear box and tacho-generator unit 74. This movement provides for adjustment of the plane of the photocathode 55 of camera tube 56 into coincidence with the image plane of lens 42. An arm 75 drives a position transducer 76 to provide an output signal corresponding to the focusing position of camera tube 56.

When the visual simulation apparatus is set for its maximum operational height, the camera 25 of FIG. 2 is at a maximum height above the model 23. The lens 42 has minimum tilt, so that lines 40' and 60' subtend the minimum angle.

Neglecting pitch movement of lens 41, the movement of the various optical elements with decreasing simulated height down to minimum operational height is as follows:
Lens 41 remains fixed;
Lens 42 moves away from lens 41 along axis 40 for a distance increasing up to 0.1 inch;
Mount 57 rotates to tilt lens 42 up to about 20° maximum;
The camera tube 56 moves away from lens 42 along axis 40 for a distance increasing up to about 1.0 inch.

The position of the optical elements at intermediate simulated heights may be computed or predetermined empirically.

Simulated pitch effect of ±15° is obtained by displacement of lens 41 in the directions 46 by about 0.05 inch. As lens 41 is moved in the direction 46a, focusing compensation is provided by moving lens 42 away from lens 41 along axis 40. Actual aircraft pitch effects are not exactly reproduced by this system, but as the pitch angle variation is not required to exceed ±15°, the errors are not significant.

Figure 5:
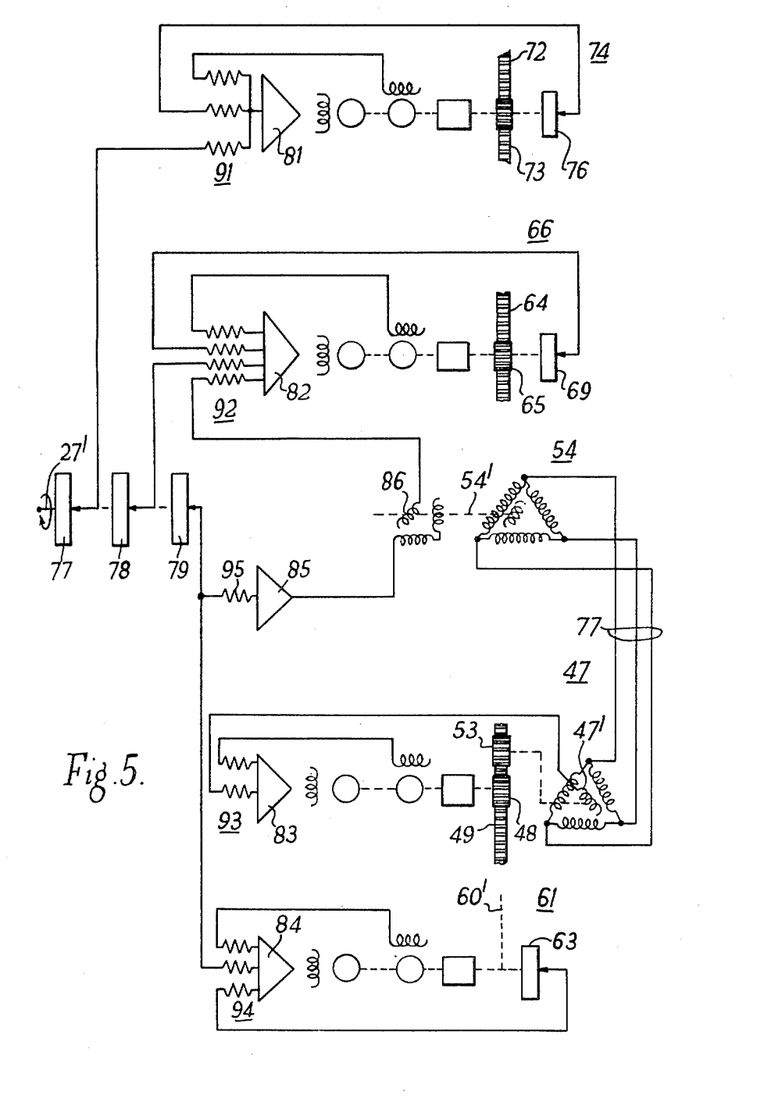
FIG. 5 is a circuit diagram of the servo-apparatus associated with the apparatus of FIG. 4.

Referring now to the circuit of FIG. 5, the mechanical parts and servo-mechanisms also shown in FIG. 4 are indicated by the same reference numerals in both figures. The stator windings of the control synchro unit 47' are connected by a three-conductor cable 77 to the corresponding stator windings of a synchro transmitter 54. The rotor of the unit 54 is driven from a shaft 54' of the pitch angle servo of the associated flight simulator.

Associated with the four servo-mechanisms 74, 66, 47, 61 and with a resolver unit 86 respectively are five servo-amplifiers 81, 82, 83, 84 and 85. Each amplifier is provided with a summing resistor network indicated generally at 91, 92, 93, 94 and 95 respectively.

Inputs to the five amplifiers are derived, as shown in FIG. 5, from potentiometers 77, 78 and 79 which are driven from the shaft 27' of the camera height drive by way of suitable speed-reduction gearing, from the rotor of the synchro unit 47', which is driven by way of pinion 53 of the pitch movement mechanism, and from the rotor of the resolver 86, which is driven from the shaft 54' of the pitch angle servo of the flight simulator.

Figure 6A:
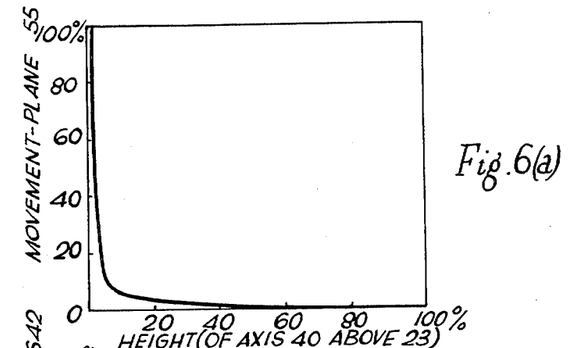
FIGS. 6(a), 6(b) and 6(c) are three curves referred to in the explanation of operation of the apparatus of FIGS. 4 and 5.

The input to the amplifier 81 is obtained from the potentiometer 77, the winding of which is contoured to provide a signal to cause the camera tube to be displaced axially by the servo 74, according to the curve of FIG. 6(a). The contour of the potentiometer winding may be determined from Equation I of the Appendix.

Figure 6B:
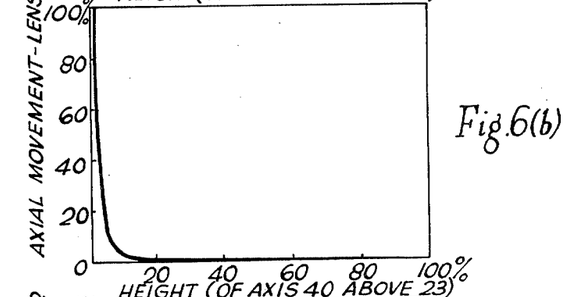

The main input to the amplifier 82 is obtained from the potentiometer 78, the winding of which is contoured to provide a signal such that the lens 42 is displaced by the servo 66 according to the curve of FIG. 6(b). The contour of the potentiometer winding may be determined from Equation II of the Appendix.

Figure 6C:
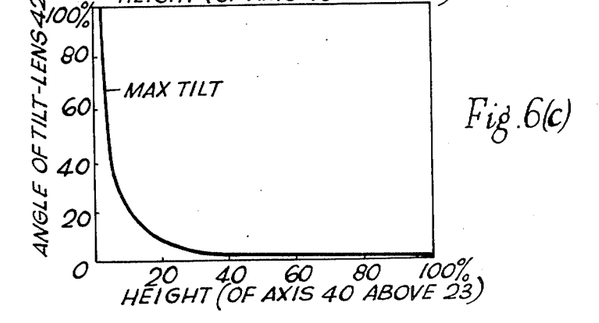

The input to the amplifier 84 is obtained from the potentiometer 79, the winding of which is contoured to provide a signal to cause the lens 42 to be tilted by the servo 61 according to the curve of FIG. 6(c). The contour of the potentiometer winding may be determined from Equation III of the Appendix.

As the lens 42 tilts, the light intensity falling on photocathode 55 is progressively cut off until the image due to lens 41 lies outside the angular field of lens 42. To maintain the illumination of the photocathode 55 of the camera tube 56 within the correct working limits, the tilt of lens 42 is arrested, together with the other motions of the mechanism of FIG. 4, just before the light collected by lens 42 becomes insufficient for the purpose. The depth of focus of the system is then relied on to produce an acceptable image at the lower altitudes. If particular emphasis on one part of the picture is required, the lens 42 is moved axially to focus on the desired details.

The input to the amplifier 83 is obtained from the rotor winding of the synchro unit 47' of servo 47. The unit 47' is fed from the complementary unit 54 driven from the simulator pitch angle servo mechanism. Thus, the servo 47 follows the pitch servo and the lens 41 is moved across the optical axis 40 by a distance proportional to the pitch angle. In the process, the axial image due to lens 41 moves a distance which is proportional to the product of $\theta$ and cot $\alpha$, where $\theta$ is the pitch angle of the simulator and $\alpha$ is the angle of inclination of the image produced by lens 41. Thus lens 42 has to move by a proportion of this distance to maintain the required focus. The angle of inclination of the image produced by lens 41 is $$\cot^{-1} \frac{K1}{H}$$

see Equations III and IV and lens 42 has to move a distance proportional to $$\frac{\theta}{H}$$

to maintain the required focus.

A signal corresponding to the value $$\tan^{-1} \frac{K}{H}$$

is provided by the potentiometer 79 and, as there is a substantially linear relationship between the values $$\frac{K}{H}$$

and $$\tan^{-1} \frac{K}{H}$$

this signal is fed to amplifier 85 and thence to one winding of resolver 86, to obtain an output from the resolver corresponding to $$\frac{K3}{H} \sin \theta$$

As the angle $\theta$ is small, the value of $\sin \theta$ is approximately equal to $\theta$ and the same resolver output may be used as the compensating signal of value $$\frac{K3\theta}{H}$$

to amplifier 82.

Figure 7:
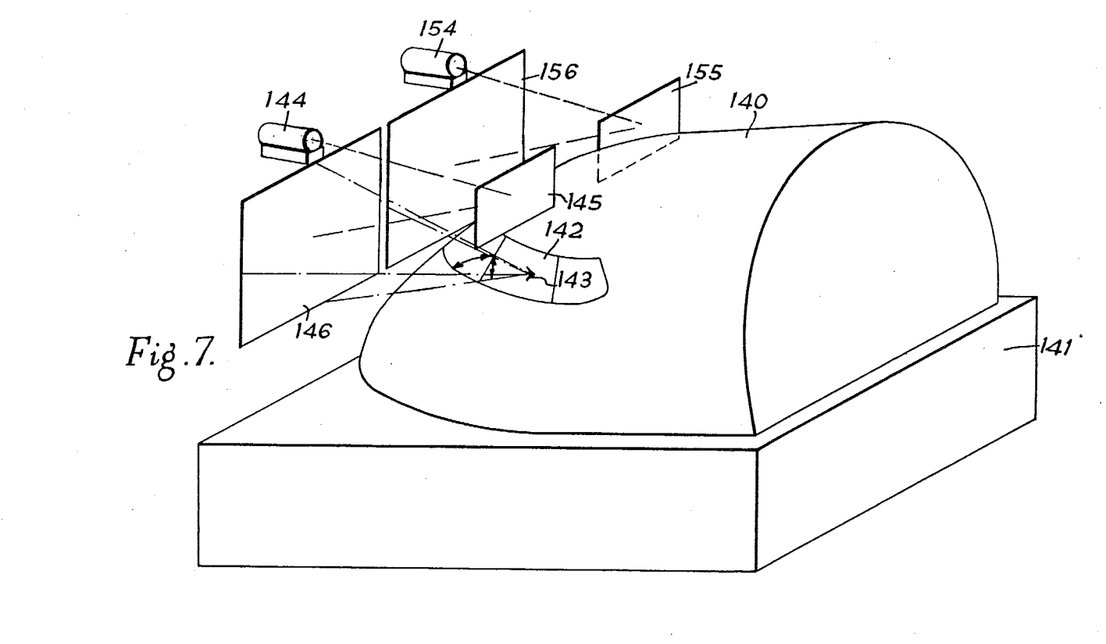
FIG. 7 shows one arrangement of a television receiver associated with the television camera of FIG. 1 or FIG. 2.

FIG. 7 shows one of many possible arrangements of a television receiver for displaying the picture transmitted from the camera tube 34 of FIG. 1 or 56 of FIG. 4. The picture tube of the receiver may be viewed directly but a more realistic scene is provided by a projected image. The apparatus of FIG. 7 provides such a projected image.

In FIG. 7, the television receiver is duplicated to provide separate displays for pilot and co-pilot.

FIG. 7 shows the part of a flight training apparatus comprising the forward part of the flight deck 140, mounted on a base 141 and provided with forward-facing windows 142. For the purpose of the present description, it is assumed that the pilot trainee is seated at the left hand side, so that the pilot's eye occupies the position 143. A co-pilot trainee is correspondingly seated on the right hand side of the structure 140.

A first television receiver 144 of the projector type provides an image which is reflected by a mirror 145 onto a screen 146, where it is seen immediately ahead of the pilot's position at 143.

An identical television receiver 154 provides an image which is reflected by a mirror 155 onto a screen 156 immediately ahead of the co-pilot's position.

APPENDIX

*Equations Relating Separation Between Units of FIG. 4 and Tilt of Lens 42*

In the following equations:

$f1$ is the focal length of lens 41.
$f2$ is the focal length of lens 42.
$H$ is the height of optical axis 40 above plane of model 23.
$d$ is the separation of the principal planes of lens 42.
$M$ is the magnification of lens 42.
$\alpha$ is the angle subtended between the ground plane of the model 23 and the corresponding image plane of lens 41.
$\gamma$ is the angle between the plane of photocathode 55 and the plane of lens 42.
$\theta$ is the angle of pitch of the flight simulator.
$\delta$ is the lateral movement of the line of intersection of the image plane of lens 41 with the ground plane 23.

*Equation I.—Separation s of Camera Tube Photocathode 55 and Focal Plane of Lens 41*

$$s = 11 f_2 \left(1.21 + \frac{f_1^2}{H^2}\right)^{\frac{1}{2}} + d\left(\frac{11}{10} + \frac{f_1^2}{11 H^2}\right)\left(1.21 + \frac{f_1^2}{H^2}\right)^{-\frac{1}{2}}$$

*Equation II.—Separation r of Focal Plane of Lens 41 From Trunnion Axis of Lens 42*

$$r = f_2 \left(1.21 + \frac{f_1^2}{H^2}\right)^{\frac{1}{2}} + d\left(\frac{1}{10} + \frac{f_1^2}{11 H^2}\right)\left(1.21 + \frac{f_1^2}{H^2}\right)^{-\frac{1}{2}}$$

*Equation III.—Tilt Angle γ of Lens 42*

$$\tan \gamma = \frac{10}{11} \cdot \frac{f_1}{H}$$

In the above equations the lens 42 has a magnification of 10.

Simulation of pitch:

$$\cot \alpha = \frac{KOf_1}{H} = \frac{K1}{H} \quad \text{Equation IV}$$

Movement of image plane of lens 41:

$$\cot \alpha = \frac{\delta}{K2\theta}$$

i.e. $\delta = K2\theta \cot \alpha$     Equation V

From Equations IV and V, therefore:

$$\delta \propto \frac{\theta}{H}$$

What we claim is:

1. Flight training apparatus comprising a representation in a plane of an object, a television camera tube having a camera screen, a lens system having component lenses associated with the camera tube for viewing at least a portion of the said representation and for forming an image of the viewed portion of the representation on the said camera screen, the plane of at least one of the component lenses of the lens system being adjustably inclinable to at least another of the component lenses and to the camera screen, means to adjust the inclination simultaneously with the movement of the camera tube in such a manner that all points on the image formed by the lens system on the camera screen are in focus for all positions of the said at least one adjustable lens, and means for providing relative movement of the television camera tube and the said representation in accordance with a simulated movement of an aircraft relative to the object.

2. Flight training apparatus as claimed in claim 1, and further comprising a television receiver responsive to signals from the television camera to provide on a receiver screen an image of at least a portion of the said representation, whereby said television receiver image is modified correspondingly to the simulated or computed aircraft movement.

3. Flight training apparatus as claimed in claim 1 in which the television camera tube is movable.

4. Flight training apparatus as claimed in claim 3, in which the camera tube is rotated with the deflection system about its axis to simulate aircraft roll.

5. Flight training apparatus as claimed in claim 1, and further comprising means for modifying the line and frame scanning of the television camera tube to compensate for scale distortion over the field of the camera tube image introduced by inclination of the adjustable lens.

6. Flight training apparatus as claimed in claim 4, and further comprising means for modifying the line and frame scanning of the television camera tube to compensate for scale distortion over the field of the camera tube image introduced by inclination of the adjustable lens.

7. Flight training apparatus as claimed in claim 1, in which at least one of the component lenses of the lens system is displaceable laterally of the camera tube axis to simulate aircraft pitch movement.

8. Flight training apparatus as claimed in claim 7, in which the lens system comprises a first group of lenses for viewing at least a portion of said representation and for providing a spatial image, a second group of lenses for viewing said spatial image and for providing an image in the plane of the photosensitive screen of the television camera tube, said first group of lenses being displaceable laterally to simulate aircraft pitch movement.

9. Flight training apparatus as claimed in claim 8, in which the axis of the second group of lenses is inclinable about an axis perpendicular to the axes of both the second group of lenses and the television camera tube and displaceable along the axis of the television camera tube.

10. Flight training apparatus as claimed in claim 9, in which the television camera tube is movable axially, and in which the movements of the first and second lens group of the lens system and the movement of the television camera tube are controlled by servo-motors energized from a servo-system and drive servo-generators connected to supply corresponding position reply signals to the servo-system.

11. Flight training apparatus as claimed in claim 10, in which the movements of the second lens group of the lens system of the television camera tube are related to the movement of the camera tube relatively to the plane of the said representation, to an extent computed by the servo-system, whereby the planes of the representation, the lens system and the photosensitive screen of the television camera tube always intersect on a common line.

References Cited in the file of this patent

UNITED STATES PATENTS

| | | |
|---|---|---|
| 2,413,633 | Jones | Dec. 31, 1946 |
| 2,474,096 | Dehmel | June 21, 1949 |
| 2,591,752 | Wicklund | Apr. 8, 1952 |
| 2,938,279 | Hemstreet et al. | May 31, 1960 |
| 2,975,671 | Hemstreet | Mar. 21, 1961 |

FOREIGN PATENTS

| | | |
|---|---|---|
| 554,518 | Canada | Mar. 18, 1958 |
| 751,628 | Great Britain | July 4, 1956 |